UNITED STATES PATENT OFFICE.

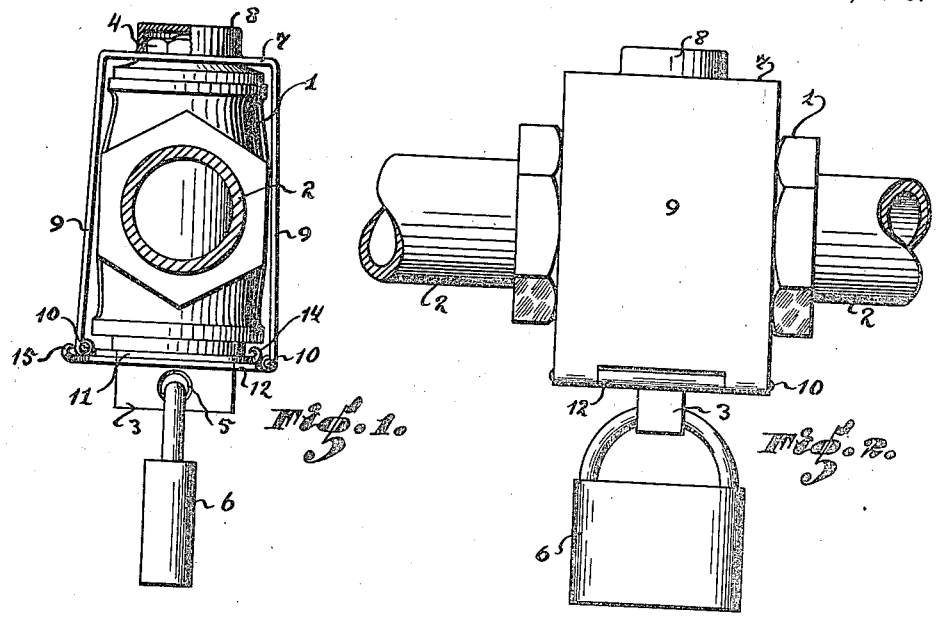
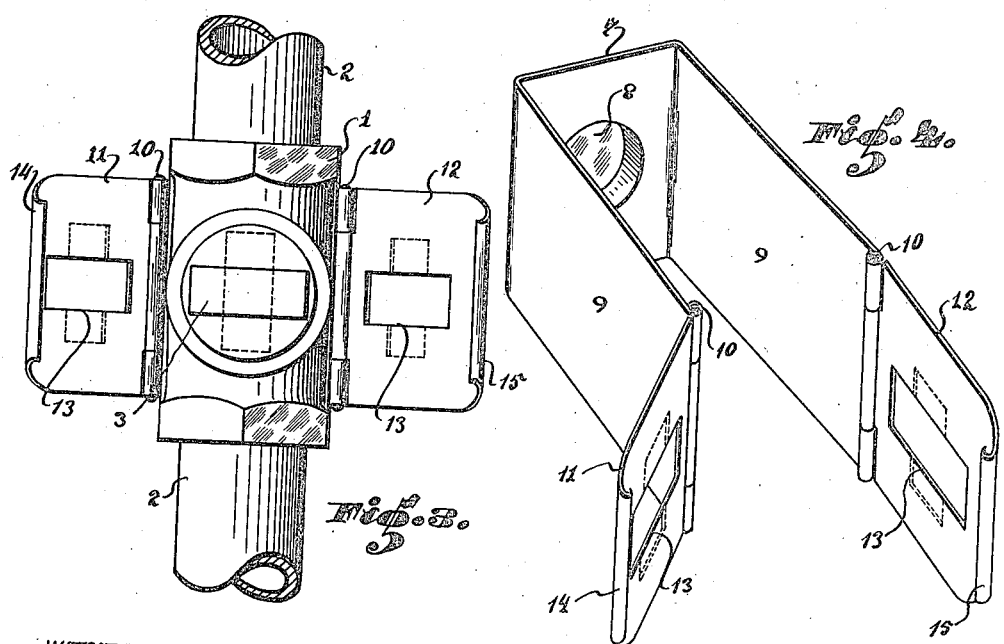

CHARLES A. CALDWELL, OF DALLAS, TEXAS.

SEALING DEVICE FOR COCKS.

1,158,631.   Specification of Letters Patent.   Patented Nov. 2, 1915.

Application filed December 28, 1914. Serial No. 879,255.

*To all whom it may concern:*

Be it known that I, CHARLES A. CALDWELL, a citizen of the United States, residing at Dallas, in the county of Dallas and State of Texas, have invented certain new and useful Improvements in Sealing Devices for Cocks, of which the following is a specification.

My invention has relation to a device for sealing or locking valves or cocks when in inoperative or operative position to prevent accidental or intentional interference with the same and in such connection it relates more particularly to the construction and arrangement of such a device.

The principal objects of my invention are first, to provide a simple and inexpensive sealing or locking device which may be readily attached to the valve or cock to be protected and which is strong in construction and efficient in operation or use; second to provide as one part of such a sealing or locking device, a box shaped member arranged to snugly fit two opposite sides and the base of the valve or cock and having two hinged lids arranged to fold down upon and interlock with the projecting stem or key of the valve or cock, the other part or member of said device comprising a padlock or other locking mechanism designed to lock said lids down upon said stem or key; and third, to provide in such a locking device certain details of construction and arrangement of parts more particularly hereinafter set forth and claimed.

The nature and scope of my invention will be more fully understood from the following description taken in connection with the accompanying drawings forming part hereof in which,—

Figure 1 is an end elevational view of a valve and a sealing device, embodying my invention, attached thereon and locked thereto. Fig. 2 is a front elevational view of the same. Fig. 3 is a top or plan view of valve and sealing device, with the lid members of said device thrown back in inoperative position, and with the padlock member removed, and Fig. 4 is a perspective view of the box-shaped member of the sealing device detached from the valve or cock.

Referring to the drawings 1 represents a valve or cock of well known construction and 2 the pipe controlled by said valve. The valve 1 has a stem 3 usually rectangular in shape and a nut 4 projecting from the side of the valve casing opposite the side from which stem 3 projects. The valve stem 3 has an opening 5 extending transversely through the stem.

The sealing or locking device embodying my invention consists essentially of a box shaped member and the padlock 6. The box shaped member has a base 7 countersunk as at 8 to inclose the nut 4 of the valve stem and two side walls 9 snugly fitting the sides of the valve casing. The base 7 and walls 9 are preferably formed of one piece of sheet metal. To the end of each wall 9 is suitably hinged as at 10 or otherwise secured the lids 11 and 12 one of which 11 is arranged to fold down below the other lid 12. Each lid 11 and 12 has a rectangular slot 13 adapted to fit over and to permit of the protuberance of the rectangular stem 3 therethrough. When in position each end lid 11 and 12 folds down successively over the stem 3 as clearly shown in Fig. 1 and the stem 3 projects therethrough to receive the padlock 6 through its transverse opening 5. Each lid 11 and 12 is provided, preferably, with a curved lip 14 and 15. The lip 14 of lid 11, when said lid is folded down upon the valve stem, fits against the hinge 10 of the other lid 12, whereas the lip 15 of lid 12 fits outside the hinge 10 of the lid 11.

In the drawings the device is shown as applied to a valve or cock 1 is closed or shut off position with regard to the pipe 2. It is obvious, however, that the device may be applied to the valve in open position, that is to say to a valve the stem 3 of which occupies the position indicated in dotted lines in Fig. 3. In such case the slots or openings 13 are cut at right angles as indicated in dotted lines in Figs. 3 and 4 to the position of the slots necessary when the valve is shut off. To adapt the sealing device to either emergency the slots 13 in the lids may be cut in the shape of a cross following in outline both full and dotted lines in Figs. 3 and 4.

It will be understood that for some classes of valves it may not be necessary that the lids 11 and 12 be hinged or provided with hinged connections 10 as illustrated in the drawings. In such instances the lids 11 and 12 may be formed integrally with each wall 9 and creased or bent over to fit upon the stem 3. Again while the padlock 6 is perhaps the simplest and most desirable locking device yet any other locking device for securing the lid members down upon the stem may be used without departing from the spirit of my invention.

Having thus described the nature and scope of my invention what I claim as new and desire to secure by Letters Patent, is:

1. In a sealing device for valves or cocks, a box shaped member formed to inclose the sides and bottom of the valve or cock, a lid projecting from each side of the box-shaped member the lids being adapted to fold down one upon the other upon the stem of the cock or valve, said lids being slotted to interlock with and to permit the stem to protrude beyond said lids, and a locking device traversing the valve stem outside said lids.

2. In a sealing device for valves or cocks, a box-shaped member formed of sheet metal and having its end countersunk to receive and cover the nut of the valve or cock, each side of said box-shaped member being provided with a hinged lid arranged to fold down upon the stem of the valve, both of said lids being transversely slotted to receive and interlock with the stem and to permit the same to protrude therethrough beyond said lids, combined with a padlock traversing the stem outside the lids.

3. In a sealing device for valves or cocks, in combination with a valve having a base and a stem, of a sheet metal box adapted to inclose the base and the two sides of the valve, and two lids, each hinged respectively to a side wall of said box and arranged to fold down over and interlock with the stem, with one lid inside the other, both lids being slotted to permit the stem to protrude therethrough, and a lip formed on the outer lid and adapted to engage the hinged connection of the inner lid with a side wall of said box on the outside of said side wall.

4. In a sealing device of the character described, in combination with a valve having a base and a stem, of a sheet metal box having two side walls and a base adapted to inclose the sides and base of said valve, a lid hinged to each side wall of the box the lids being adapted to fold down upon each other and upon the valve stem to interlock with said stem, each lid being provided at its free end with a downwardly projecting lip, the lip of said inner lid extending to the hinged connection between the outer lid and its wall inside said wall and the lip in the outer lid filling over the hinged connection between the inner lid and its wall outside said wall, both said lids being slotted to permit the valve stem passing through and beyond said lids, all combined with a padlock traversing the protruding portion of the stem beyond said lids.

In testimony whereof I have signed my name to this specification in the presence of two subscribing witnesses.

CHARLES A. CALDWELL.

Witnesses:
G. C. WALDROP,
R. E. C. BRUCKNER.